United States Patent [19]

Klupt et al.

[11] Patent Number: 5,014,299
[45] Date of Patent: May 7, 1991

[54] MODEM COUPLER FOR MULTI-LINE KEY TELEPHONE SYSTEM

[76] Inventors: Christopher Klupt, 48 Van Nostrand Ave., Great Neck, N.Y. 11024; Jerald Zupnick, 15 Hampton Rd., Port Washington, N.Y. 11050

[21] Appl. No.: 382,227
[22] Filed: Jul. 20, 1989
[51] Int. Cl.$^5$ .......................................... H04M 11/00
[52] U.S. Cl. ...................................... 379/98; 379/165
[58] Field of Search .............. 379/98, 93, 156, 165, 379/94, 97, 442, 443

[56] References Cited

U.S. PATENT DOCUMENTS

| | | | |
|---|---|---|---|
| 4,367,374 | 1/1983 | Serrano | 379/93 |
| 4,491,694 | 1/1985 | Harmeyer | 379/442 |
| 4,514,597 | 4/1985 | Kikuchi et al. | 379/165 |
| 4,809,317 | 2/1989 | Howe et al | 379/98 |
| 4,868,865 | 9/1989 | Ogawa et al. | 379/100 |

OTHER PUBLICATIONS

A-JEM, Sidwell Development Ltd., Jan. 26, 1988.
Phone Flex, TVMP Inc., PCWEEK, Jun. 1988.

Primary Examiner—Jin F. Ng
Assistant Examiner—Stella L. Woo
Attorney, Agent, or Firm—Michael Ebert

[57] ABSTRACT

A modem coupler making it possible for a modem to access an analog signal telephone communication system directly from a multi-line key telephone set, the modem interfacing the system with a digital computer terminal or any other terminal that processes digital data. The modem coupler is self-sufficient whereby its interposition between the modem, the telephone set and the communication system entails no additional wiring or modifications of the telephone set, the modem, or the system.

4 Claims, 2 Drawing Sheets

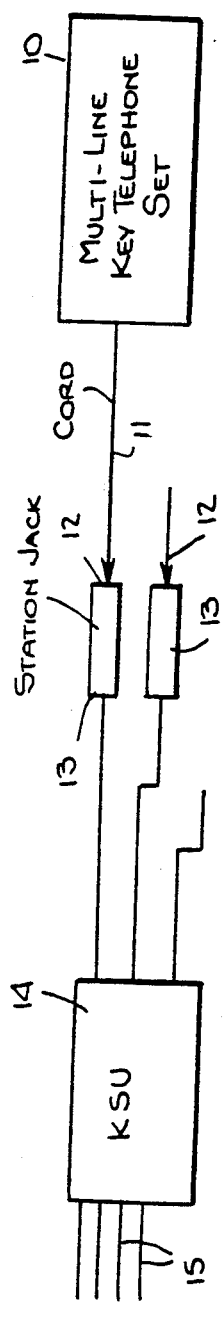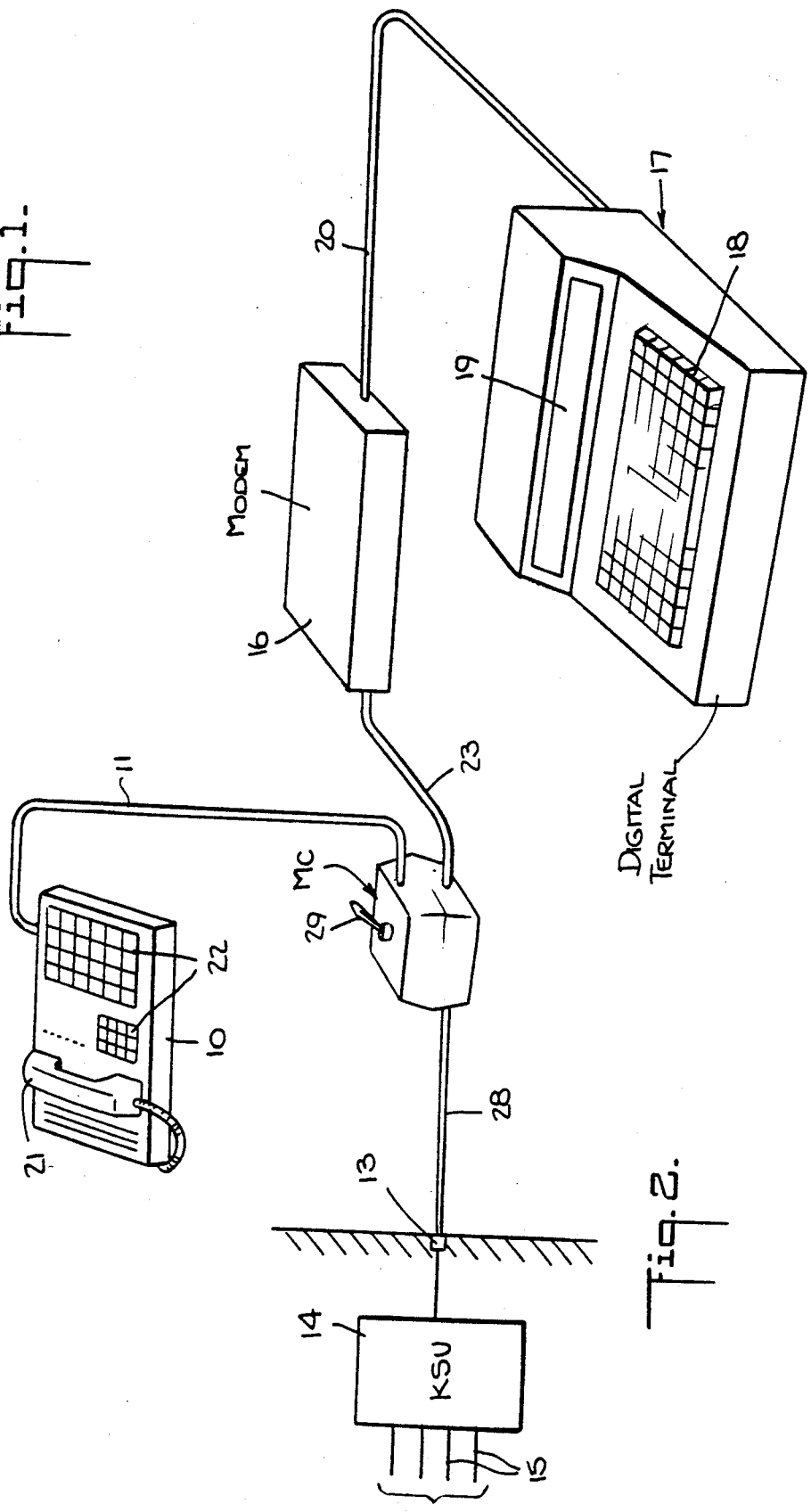

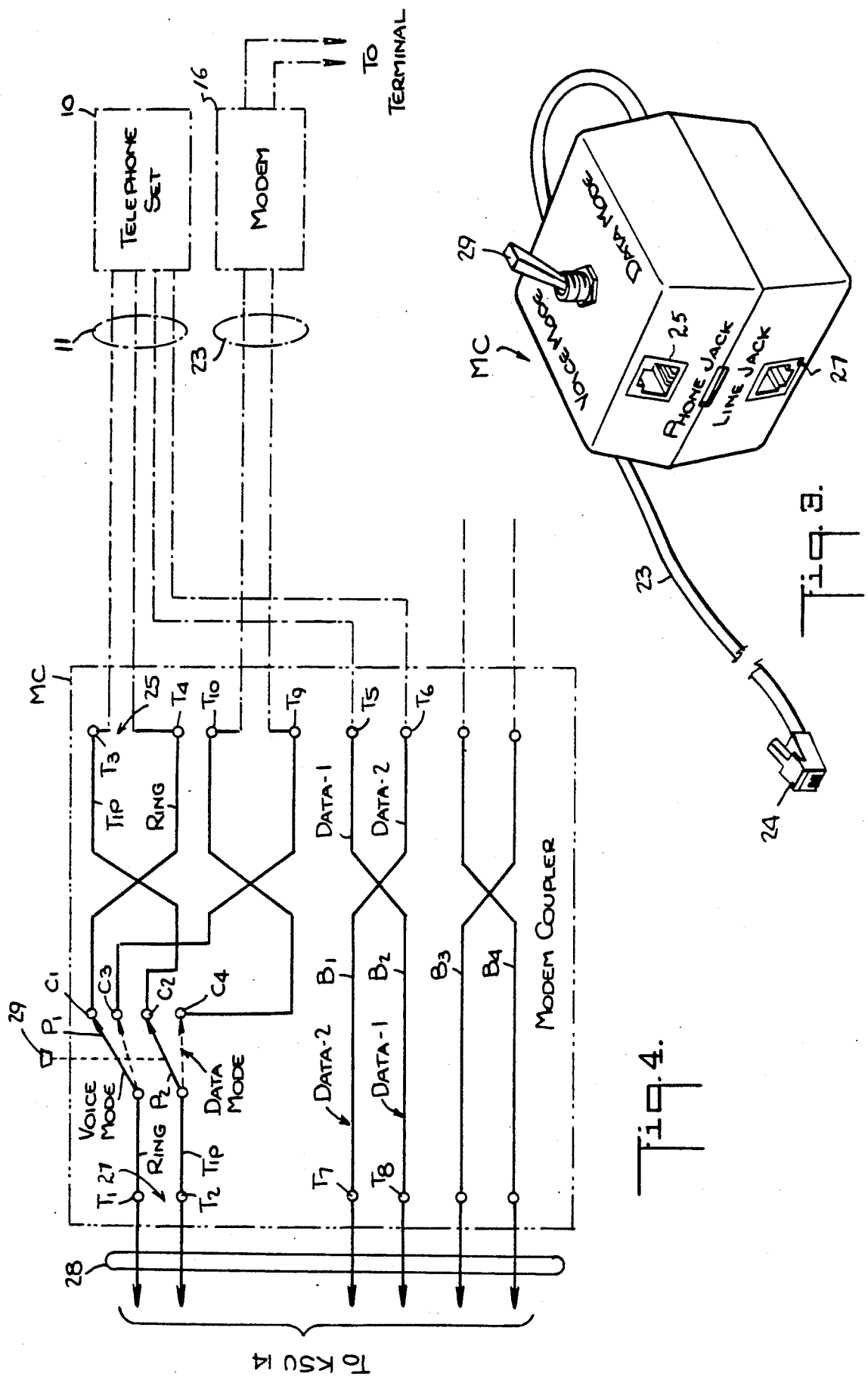

MODEM COUPLER FOR MULTI-LINE KEY TELEPHONE SYSTEM

BACKGROUND OF INVENTION

1. Field of Invention:

This invention relates generally to modems for interfacing with an analog signal communication system a digital computer terminal, or any other terminal which processes digital signals, and more particularly to a self-sufficient modem coupler making it possible, for a modem to access the system directly from a multi-line key telephone set without additional wiring or modifications of the telephone set, the modem, the terminal or the system.

2. Status of Prior Art:

Telephone lines are presently used not only for voice communications but also to convey computer data, facsimile or other signals in digital form. The digital signal is usually achieved by quantization in amplitude and time. The rapidly expanding demand for communication from terminals which process digital data has heightened interest in transmitting and receiving digital signals over analog signal telephone communication lines.

In order to transmit digital signals over a telephone line designed to carry voice signals in a 300 to 3000 Hz range, the digital signals must be modulated at the transmitting end before they can be sent over the telephone line. At the receiving end they must be demodulated to convert them back to the original digital signals. Since digital data communication takes place in both directions, each end must include a modulator-demodulator or modem.

The typical modern office, in addition to the usual telephone sets, is provided with a facsimile terminal for transmitting and receiving documents over a telephone line, the facsimile terminal being coupled to the line through a modem. But the line reserved by the facsimile terminal is a telephone line dedicated to this instrument, a separate telephone line being used to accommodate the telephone set. The telephone company therefore exacts a separate fee for the use of the facsimile line.

This is also true when the office is equipped with a computer terminal whose data is fed over a telephone line through a modem. In a teleprocessing system, a multiplicity of remote computer terminals access a main frame computer by way of a network of telephone communication lines. Such systems, which are now widely used, can provide various data processing services to many office and home locations without the need for a computer at each location.

To obviate the need for a dedicated line, the patent to Murto et al., 4,378,470, provides an interface circuit to permanently couple a modem to a non-dedicated telephone line which does not disturb the normal use of the line for telephone communication. The interface required for this purpose involves relatively elaborate circuitry.

The patent to Faggin et al., 4,578,537, also discloses a complex interface between a digital computer and a telephone set, the interface including a modem for transmitting and receiving the data signals.

In the patent to Carter et al., 4,596,021, a modem is disclosed that allows a user to switch between voice and data telecommunication during the same phone call without redialing. Along similar lines is the complex system shown in the patent to Faggin et al., 4,524,244.

Of particular interest is the patent to Serrano, 4,367,374, which provides modem coupling from an ordinary dial telephone to a computer terminal. To this end, an interface is interposed in the line leading to the handset. The interface is provided with switches to provide different modes of operation--one being normal phone operation and another, normal modem operation. While the circuit of the interface is not complicated, the installation of the interface makes it necessary to break into the telephone set.

Thus while the prior art discloses various expedients to interface a modem to a non-dedicated telephone line which do not disturb the normal use of the line for telephone communication, in all cases additional wiring is required or some modifications must be made in the telephone set or in other aspects of the system. It is therefore not possible for a typical user to install the necessary interface equipment, for to do so requires special skills. Nor can the installation be made at low cost by the user himself.

SUMMARY OF INVENTION

In view of the foregoing, the main object of this invention is to provide a modem coupler making it possible for a modem to access an analog signal telephone communication system directly from a multi-line key telephone set, the modem interfacing a digital computer terminal or any other terminal that processes digital signals with the system.

More particularly, an object of the invention is to provide a modem coupler of the above type which is a self-sufficient unit whereby its interposition between the modem, the telephone set and the communication system entails no additional wiring or modifications of the telephone set, the modem, or the system.

Also an object of the invention is to provide a self-sufficient modem coupler which may be manufactured at low cost, which operates reliably and efficiently, and whose installation is simple to carry out and requires no special skills.

Briefly stated, these objects are attained in a modem coupler in accordance with the invention making it possible for a modem to access a telephone communication system directly from a multi-line key telephone set. The coupler includes a double-pole, double-throw mechanical or electronic switch whose poles re connectable to a communication line leading to the key service unit of the telephone system.

In the voice communication mode, the poles of the switch engage a first pair of contacts which are connectable to the telephone set. In the data communication mode, the poles of the switch engage a second pair of contacts which are connectable to the modem. Also included in the coupler is at least one pair of bridges connecting the control signal terminals of the telephone set to a control signal line leading to the key service unit.

BRIEF DESCRIPTION OF DRAWINGS

For a better understanding of the invention, reference is made to the following detailed description to be read in conjunction with the accompanying drawings, wherein:

FIG. 1 is a block diagram showing the conventional connections between a standard multi-line or multi-line key telephone set and the key service unit of a telephone system;

FIG. 2 illustrates a modem coupler in accordance with the invention giving a modem access to the telephone system directly from the multi-line telephone set;

FIG. 3 is a perspective view of a preferred embodiment of the modem coupler; and FIG. 4 is a schematic circuit diagram of the modem coupler.

DESCRIPTION OF INVENTION

Standard multi-line Key Telephone System:

Referring now to FIG. 1, the existing arrangement is shown of a standard multi-line or multi-line telephone system in which each subscriber is provided with a multi-line key telephone set 10.

When a given location has more than one line from the central office (C/O) or private branch exchange (PBX) and a number of telephone stations, it is desirable to equip the telephone station with key sets. A multi-line key telephone set is provided with keys to make available to the user features lacking in a single line telephone set. In a typical six button key telephone set, the user may pick up one of three central office lines, or hold one or more lines and to use any other. Or the set may by way of a key pick up an intercom line.

The standard multi-line key telephone set includes a modular cord 11 that terminates in a plug 12. This plug is insertable in a station jack 13 leading to a key service unit (KSU) 14 connected to central office C/O lines 15.

In a multi-line key telephone system, telephone set 10 sends out digital control signals over a control pair line extending through cord 11 to KSU 14. KSU switches tip and ring to the C/0 or intercom that is requested by the control signal, provided that the requested line is idle. The analog voice signal is conveyed over the tip and ring line pair through cord 11 to KSU 14 where relays seize the requested C/0 or intercom line. In some systems, additional control pairs are provided. The present invention, which involves a modem coupler, does not when it operates in the voice communication mode disturb or modify the usual multi-line key telephone system relationships.

The Modem-Telephone Set System:

Referring now to FIGS. 2 and 3, a modem-telephone set system is shown in which a standard modem 16 is coupled to a terminal 17 which processes digital signals, the digital data signals being modulated by modem 16 for conveyance over an analog signal communication line. The modem demodulates incoming data signals fed through the line from a remote computer or other source.

By way of example, terminal 17 is shown as a desktop computer terminal having a keyboard 18 into which data is entered, and an electronic display 19 on which is presented data entered into and received by the terminal. In practice, terminal 17 may be a facsimile terminal, a telex terminal or any other digital terminal to be interfaced with the analog signal communication system by way of modem 16 to which it is connected by a modular cord 20.

Also provided is a self-sufficient modem coupler in accordance with the invention, generally identified as MC. Modem coupler MC affords modem 16 access to the central office C/O or PBX line directly from the multi-line key telephone set 10. Set 10 is provided with a hand set 21 and keys 22.

As best seen in FIG. 3, modem coupler MC is provided with a modular cord 23 terminating in a plug 24. Plug 24 is inserted in a complementary jack in modem 16, thereby linking the coupler to the modem.

Modem coupler MC is provided with a phone jack 25 into which is inserted the plug of set cord 11 extending from telephone set 10, thereby linking the coupler to the set. Modem coupler MC also is provided with a line jack 27 into which is inserted the plug of a line cord 28 connected to the station jack 13 of the telephone system station. Jack 13 is connected to KSU 14, thereby linking the modem coupler to the analog telephone communication system.

Also included in modem coupler MC is a selector switch 29 which in one operating position causes the modem to function in the voice communication mode wherein the user of the telephone sets makes and receives calls as in the conventional FIG. 1 arrangement. In the other operable position of the switch, the modem coupler functions in the data communication mode in which modem 16 then has access to the telephone system from the telephone set for conveyance of data to and from terminal 17. In the data communication mode, the telephone set sends a control signal to the KSU that causes a central office line seizure. The modem than has access to a central office line, goes off hook to dial the receiving computer terminal or facsimile.

The Modem Coupler Circuit:

Referring now to FIG. 4, there is shown schematically the internal circuit of modem coupler MC. The coupler switch 29 is a double-pole, double-throw switch. In practice this may be a mechanical switch, as shown, or an equivalent solid state transistorized switch, in which case a battery is required for producing the biasing voltages to actuate the switch.

The poles $P_1$ and $P_2$ are connected to line jack terminals $T_1$ (Ring) and $T_2$ (Tip) for connection through cord 28 to station jack 13 leading to KSU 14. In the voice communication mode, the switch is operated to cause poles $P_2$ and $P_2$ to then engage fixed contacts $C_1$ and $C_2$ This pair of contacts is connected to terminals $T_3$ and $T_4$ of phone jack 25 connected by set cord 11 to telephone set 10.

Also included in the modem coupler is at least one pair of bridges $B_1$ and $B_2$. These bridges connect the control signal terminals of telephone set 10 through cord 26 leading to MC terminals $T_5$ and $T_6$ to KSU 14 by means of MC terminals $T_7$ (Data-2) and $T_8$ (Data-1). Bridges $B_3$ and $B_4$ represent another pair of bridges, if required by the telephone set.

In the data communication mode, switch 29 is operated to cause poles $P_1$ and $P_2$ to then engage fixed contacts $C_3$ and $C_4$. This pair of contacts is connected to coupler terminals $T_9$ and $T_{10}$ which are connected through cord 23 to modem 16. Thus in the voice communication mode, telephone set 10 is connected by switch 29 to the ring and tip terminals $T_1$ and $T_2$ of the modem coupler, which in the data communication mode, modem 16 is connected to these terminals.

Tip and ring at the jack of multi-line telephone 10 is an open circuit. Data-1 and Data-2 and all other control pairs pass through modem coupler MC to the telephone set unchanged.

When the phone goes off the hook and a line key is depressed, KSU 14 checks for an idle condition and then seizes the requested line. Modem coupler MC, by way of switch 29, diverts tip and ring at terminals $T_1$ and $T_2$ from telephone set 10 to modem 16, thereby giving the modem access to an outside line. The modem can now go on and off hook as many times as is required in the course of transmitting and receiving data without losing control of the central office line, as long as the multi-line phone set remains off hook. But when the phone is placed on the hook, the central line is then released.

All that is necessary to install a modem coupler at a station having a multi-line key telephone set, whose set cord 11 has its plug inserted in station jack 13 for voice communication, is to remove this plug from the station jack and insert it in phone jack 25 of modem coupler MC whose cord 23 has its plug 24 inserted in the line jack of modem 16. Finally, line cord 28 is plugged at one end into line jack 27 of the modem coupler MC and at the other end into station jack 13 to complete the arrangement.

While there has been shown and described a preferred embodiment of a modem coupler for multi-line key telephone system in accordance with the invention, it will be appreciated that many changes and modifications may be made therein without, however, departing from the essential spirit thereof.

Thus in some instances, it may be desirable to also interface an analog signal device such as a tape recorder, a telephone answering machine or a speakerphone with the analog signal telephone system, a modem not being required in such an interface. To this end, the modem coupler, which in the embodiment shown is a two-position switch, will take the form of a double-pole, triple-throw switch. In the first position of the switch, the multiplexed key telephone set will be connected to the station jack to connect the set to the system, in the second position, the modem coupled to the digital data processing terminal will be connected to the station jack to connect the digital data terminal to the system, while in the third position, the analog signal device will be connected to the station jack to interface this device with the system.

I claim:

1. A self-sufficient modem coupler making it possible for a modem coupled to a digital data processing terminal to access a key service unit of an analog telephone communication system directly from a multi-line key telephone set having a set cord terminating in a plug that is normally inserted in a station jack to connect the set to the key service unit of the system, said modem coupler being provided with ring, tip and at least one pair of data terminals and comprising:

(a) a coupler cord for connecting the modem coupler to the modem;
   (b) a phone jack to receive the plug of the telephone set for connecting the set to the coupler;
   (c) a line jack to receive a line cord to connect the terminals of the coupler to the station jack, whereby the coupler is then connected to corresponding terminals in the key service unit; and
   (d) a double-pole, double-throw switch having one operative position that puts the modem coupler in a voice communication mode and in another operative position, puts the modem coupler in a data communication mode, said switch in said one position connecting the multi-line telephone set to said station jack and in doing so connects said set to said key service unit, said switch in said other position connecting said modem to said station jack and in doing so giving the modem access to an outside line.

2. A modem coupler as set forth in claim 1, provided with a line jack for receiving the plug at one end of a line cord whose other end is plugged into said station jack.

3. A modem coupler as set forth in claim 1, wherein said terminal is a digital computer terminal.

4. A modem coupler as set forth in claim 1, wherein said terminal is a facsimile terminal.

* * * * *